US011538283B1

(12) United States Patent
Lev et al.

(10) Patent No.: US 11,538,283 B1
(45) Date of Patent: Dec. 27, 2022

(54) DETECTING PEOPLE WEARING MASKS TO PREVENT IMPERSONATION ATTACKS

(71) Applicant: NEC Corporation Of America, Herzlia (IL)

(72) Inventors: Tsvi Lev, Tel-Aviv (IL); Yaacov Hoch, Ramat-Gan (IL); Aaron Mark Lieber, Rishon le Zion (IL)

(73) Assignee: NEC Corporation Of America, Herzlia (IL)

( * ) Notice: Subject to any disclaimer, the term of this patent is extended or adjusted under 35 U.S.C. 154(b) by 0 days.

(21) Appl. No.: 17/342,612

(22) Filed: Jun. 9, 2021

(51) Int. Cl.
*G06V 40/40* (2022.01)
*G06K 9/62* (2022.01)
*G06T 7/55* (2017.01)
*G06T 7/33* (2017.01)
*G06V 10/60* (2022.01)
*G06V 10/143* (2022.01)
*G06V 40/16* (2022.01)

(52) U.S. Cl.
CPC ........... *G06V 40/40* (2022.01); *G06K 9/6288* (2013.01); *G06T 7/33* (2017.01); *G06T 7/55* (2017.01); *G06V 10/143* (2022.01); *G06V 10/60* (2022.01); *G06V 40/166* (2022.01); *G06V 40/168* (2022.01); *G06T 2207/10048* (2013.01); *G06T 2207/30201* (2013.01)

(58) Field of Classification Search
CPC .... G06V 40/40; G06V 40/166; G06V 40/168; G06V 10/143; G06V 10/60; G06K 9/6288; G06T 7/33; G06T 7/55; G06T 2207/10048; G06T 2207/30201
See application file for complete search history.

(56) References Cited

U.S. PATENT DOCUMENTS

2017/0017852 A1\* 1/2017 Su .................... G06V 10/143
2018/0285668 A1\* 10/2018 Li .................... G06K 9/6269

\* cited by examiner

*Primary Examiner* — Casey L Kretzer

(57) ABSTRACT

Disclosed herein are methods and system for determining whether a user is wearing a mask, comprising receiving one or more infrared images depicting the user's face in one or more infrared spectral ranges and one or more visible light images depicting the user's face in visible light spectral range, registering the infrared image(s) to the visible light image(s), computing luminance values of a plurality of pixels relating to the user's face in the visible light image(s), computing infrared reflectiveness values of corresponding pixels in the registered infrared light image(s), computing, for each of the pixels, a difference between the luminance value and the infrared reflectiveness value and determining the user is genuine and not wearing a mask in case an aggregated difference aggregating the difference values of the pixels relating to the user's face exceeds a certain value.

12 Claims, 3 Drawing Sheets

DETECTING PEOPLE WEARING MASKS TO PREVENT IMPERSONATION ATTACKS

FIELD AND BACKGROUND OF THE INVENTION

The present invention, in some embodiments thereof, relates to detecting people wearing masks in impersonation attacks, and, more specifically, but not exclusively, to detecting people wearing masks in impersonation attacks based on face analysis in one or more infrared spectral ranges.

Imaging and video based applications ranging from online communication to access to devices and resources, for example, video conferences, video chats, online services, device access and/or the like have become highly common and popular in recent time with the constant and rapid advancement of technology, increased network availability and capacity, increased computing power and more.

Another major contributor to the constantly increasing demand for video based sessions is the fact that many human interactions have been replaced by video sessions, for example, work sessions, educational sessions, social activities and many more. This trend has significantly expanded under the constraints imposed during the COVID-19 epidemic during which travel and mobility of large segments of the population is highly limited.

However, while enabling direct, easy and immediate access and/or interaction, such video and/or imaging based applications, resources and/or services may need to be protected in order to prevent them from being exploited by potential malicious parties which may fraudulently impersonate as genuine and legitimate users for one or more malicious goals.

SUMMARY OF THE INVENTION

According to a first aspect of the present invention there is provided a computer implemented method of determining whether a user is wearing a mask, comprising using one or more processors for:

Receiving one or more infrared images depicting a face of the user in one or more infrared spectral ranges and one or more visible light images depicting the face of the user in visible light spectral range.

Registering the one or more infrared images to the one or more visible light images.

Computing luminance values of a plurality of pixels relating to the face of the user in the one or more visible light images.

Computing infrared reflectiveness values of corresponding pixels in the registered one or more infrared light images.

Computing, for each of the pixels, a difference between the luminance value and the infrared reflectiveness value.

Determining the user is genuine and not wearing a mask in case an aggregated difference aggregating the difference values of the pixels relating to the face exceeds a certain value.

According to a second aspect of the present invention there is provided a system for determining whether a user is wearing a mask, comprising one or more processor configured to execute a code, the code comprising:

Code instruction to receive one or more infrared images depicting a face of the user in one or more infrared spectral ranges and one or more visible light images depicting the face of the user in visible light spectral range.

Code instruction to register the one or more infrared images to the one or more visible light images.

Code instruction to compute luminance values of a plurality of pixels relating to the face of the user in the one or more visible light images.

Code instruction to compute infrared reflectiveness values of corresponding pixels in the registered one or more infrared light images.

Code instruction to compute, for each of the pixels, a difference between the luminance value and the infrared reflectiveness value.

Code instruction to determine the user is genuine and not wearing a mask in case an aggregated difference aggregating the difference values of the pixels relating to the face exceeds a certain value.

According to a third aspect of the present invention there is provided a computer program product for determining whether a user is wearing a mask, comprising one or more computer readable storage media having thereon:

First program instructions executable by one or more processor to cause the one or more processor to receive one or more infrared images depicting a face of the user in one or more infrared spectral ranges and one or more visible light images depicting the face of the user in visible light spectral range.

Second program instructions executable by the one or more processor to cause the one or more processor to register the one or more infrared images to the one or more visible light images.

Third program instructions executable by the one or more processor to cause the one or more processor to compute luminance values of a plurality of pixels relating to the face of the user in the one or more visible light images.

Fourth program instructions executable by the one or more processor to cause the one or more processor to compute infrared reflectiveness values of corresponding pixels in the registered one or more infrared light images.

Fifth program instructions executable by the one or more processor to cause the one or more processor to compute, for each of the pixels, a difference between the luminance value and the infrared reflectiveness value.

Sixth program instructions executable by the one or more processor to cause the one or more processor to determine the user is genuine and not wearing a mask in case an aggregated difference aggregating the difference values of the pixels relating to the face exceeds a certain value.

In a further implementation form of the first, second and/or third aspects, the certain value equals 25%.

In an optional implementation form of the first, second and/or third aspects, one or more light sources are operated to project light on the face of the user in one or more of a plurality of spectral ranges comprising visible light spectral range and one or more infrared spectral ranges.

In a further implementation form of the first, second and/or third aspects, the plurality of pixels relating to the face of the user are identified using one or more face detection algorithms.

In a further implementation form of the first, second and/or third aspects, the plurality of pixels relating to the face of the user are identified by computing a median difference value between the luminance value of each of a plurality of pixels of the one or more visible light images and the infrared reflectiveness value of the corresponding pixel in the one or more infrared images with respect to adjacent pixels using a sliding window comprising a group of pixels around the respective pixel.

In a further implementation form of the first, second and/or third aspects, the size of the sliding window is 5×5 pixels and is moved in 1 pixel steps.

In a further implementation form of the first, second and/or third aspects, the one or more infrared spectral ranges are members of a group consisting of: near infrared (NIR) having a wavelength in a range of 700-1000 nanometers and/or short wave infrared (SWIR) having a wavelength in a range of 1000-3000 nanometers.

In a further implementation form of the first, second and/or third aspects, registering the one or more infrared images to the one or more visible light images is based on a calibration of one or more imaging sensors configured to capture the one or more infrared images with respect to one or more imaging sensors configured to capture the one or more visible light images.

In a further implementation form of the first, second and/or third aspects, registering the one or more infrared images to the one or more visible light images is based on a depth analysis mapping the face of the user in the one or more infrared images compared to the one or more visible light images.

In a further implementation form of the first, second and/or third aspects, registering the one or more infrared images to the one or more visible light images is based on analysis of one or more facial features identified the face of the user in the one or more infrared images and in the one or more visible light images.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
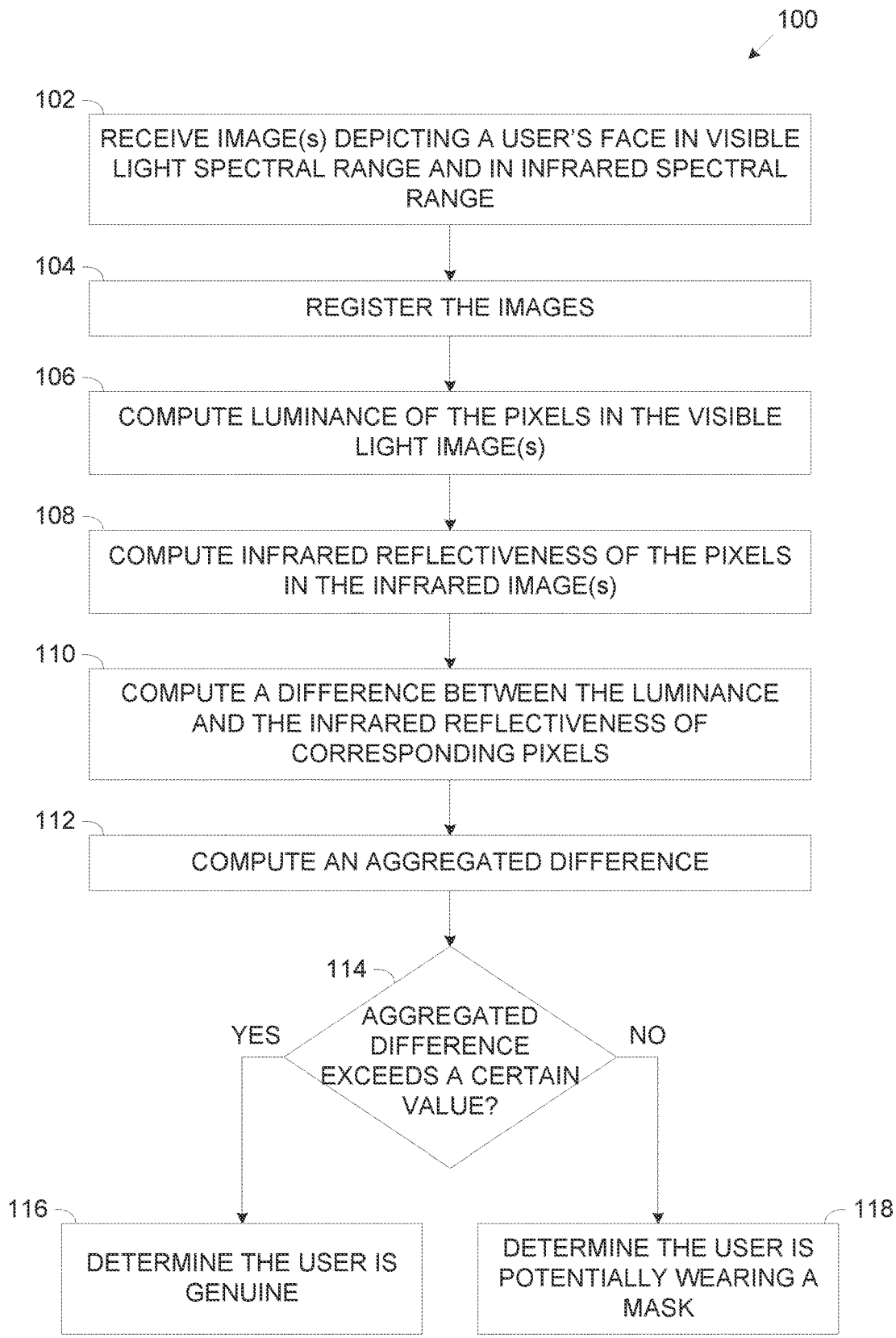
FIG. 1 is a flowchart of a first exemplary process of determining whether a user is genuine or potentially wearing a mask, according to some embodiments of the present invention.

The present invention, in some embodiments thereof, relates to detecting people wearing masks in impersonation attacks, and, more specifically, but not exclusively, to detecting people wearing masks in impersonation attacks based on face analysis in one or more infrared spectral ranges.

According to some embodiments of the present invention, there are provided methods, systems and computer program products for determining whether a user is genuine or a potential impersonator wearing a mask based on analysis of images depicting the face of the user in a plurality of spectral ranges, specifically in visible light range and in one or more infrared spectral images, for example, Near Infrared (NIR), Short Wave Infrared (SWIR) and/or the like.

Determining and/or estimating whether users are genuine or potential impersonators imitating real users may be used to support access to protected services and/or resources in general and for user authentication in particular.

Specifically, the users may be estimated as genuine users or potential fraudulent impersonators for applications involving client devices, for example, a server, a desktop computer, a laptop computer, a Smartphone, a tablet, a proprietary client device and/or the like used by the users to access one or more protected services. Such protected services may include, for example, logging into client devices, engaging in video sessions, accessing online resources (service, account, network, system, platform, etc.) such as, for example, financial services, social media platforms, private networks, online commerce websites and/or the like.

One or more imaging sensors, for example, camera, a video camera, a webcam and/or the like may be deployed to capture images of the user while accessing the protected service(s) using his client device. In particular, the imaging sensor(s) may be configured to capture images of the user in a plurality of spectral ranges, specifically in the visible light spectral range and in one or more infrared spectral ranges, for example, NIR, SWIR and/or the like.

The images captured in the visible light spectral range and in the infrared spectral range(s) may be first registered to each other to establish a common reference, for example, a common coordinate system which may be used to map corresponding pixels in the different images which depict the same real world spatial location. This means that corresponding pixels in the different images may depict the same object and/or part thereof in the real world.

The visible light image(s) may be analyzed to compute a luminance value for each of the pixels representing a brightness value of the respective pixel which is indicative of the level of visible light reflectiveness of the respective pixel.

The visible light image(s) may be then analyzed to compute a luminance value for each of the pixels in the visible light image(s). The luminance value of each pixel may represent a brightness value of the respective pixel which is indicative of the level of visible light reflected by the respective pixel.

Similarly, the infrared image(s) may be analyzed to compute an infrared reflectiveness value for each of the pixels in the infrared image(s).

Moreover, the face of the user may be first detected in the images using one or more methods, techniques and/or algorithms known in the art and only pixels which are mapped to the face of the user, i.e., relating to the face of the user may be processed, i.e., have their luminance value and infrared reflectiveness value computed. One or more methods, techniques and/or algorithms known in the art may be applied to identify the pixels relating to (mapping, depicting, etc.) the face of the user, for example, computer vision, image processing, classifier and/or the like applied to identify the face of the user, an outline of the face, a texture of the face, one or more facial features and/or the like.

A difference may be than computed between the luminance value of each pixel in the visible light image(s) and the infrared reflectiveness value of the corresponding pixel in the registered infrared image(s). Optionally, the difference may be computed between the luminance value and the infrared reflectiveness value of each pixel relating to the face of the user. For example, the infrared reflectiveness value of each pixel in the infrared image(s) may be subtracted from the luminance value of the corresponding pixel in the visible light image(s).

An aggregated difference may be computed by aggregating, for example, averaging, weighting and/or the like the difference values computed for the plurality of pixels in the registered visible light and infrared images.

Optionally, the aggregated difference may be computed for only a subset of the pixels in the registered visible light and infrared images, specifically, for pixels relating and/or mapped to the user's face. As such, the face of the user may be first detected in the images and only pixels which are mapped to the face may be processed, i.e., have the difference between their luminance value and their infrared reflectiveness value computed and added to the aggregated difference.

Moreover, the face of the user may be identified by computing a median difference value for each of the pixels in the registered visible light and infrared images based on a sliding window comprising a group of pixels around the respective pixel such that the median deference value is computed for the middle pixel in the window compared to a group of adjacent pixels surrounding the respective pixel.

Every natural occurring object, element, substance and/or material as well as artificially manufactured objects, elements, substances and/or materials may be characterized by its light reflectiveness characteristics in one or more light spectral ranges, for example, visible light spectral range (400-700 nanometer), infrared spectral ranges such as, for example, NIR (700-1400 nanometer), SWIR (1400-3000 nanometer) and/or the like.

The human skin, for example, the human facial skin is characterized, as known in the art, by reflecting significantly lower level of infrared light compared to the level of visible light it reflects. For example, the human facial skin may reflect 25% less light in the infrared spectral range(s) compared to the level of light reflected in the visible light spectrum. Artificial materials on the other hand, in particular, materials used to produce reliable masks simulating the facial features of real people, for example, silicon, rubber, polyester and/or the like may be characterized by reflecting similar light levels across the visible light spectral range and the infrared spectral range(s), for example, NIR, SWIR and/or the like. This means that such mask materials may reflect substantially the same amount of light in both the visible light spectral range and in one or more of the infrared spectral ranges.

Therefore, in case the aggregated difference exceeds a certain value, for example, 20%, 25%, 30% and/or the like, the user may be determined to be a genuine user. However, in case the aggregated difference does not exceed the certain value, i.e., is less than certain value, the user may be estimated to be a potential fraudulent impersonator wearing a mask in attempt to imitate a real user.

An indication may be output, for example, transmitted, delivered, distributed, presented and/or the like to indicate whether the user is determined to be a genuine user or a potential impersonator wearing a mask.

Determining whether users are genuine or potentially wearing masks based on analysis of the light reflectiveness characteristics of the user's face in a plurality of spectral ranges may present major advantages and benefits compared to existing methods and systems for verifying users are genuine users.

First, an impersonator wearing a mask in attempt to fraudulently impersonate as a legitimate user may be able to deceive existing user verification and/or authentication systems which are based on face recognition since theses existing systems are typically configured to analyze images of the user's face and compare them to an approved reference pattern associated with the user. Current technology enables creation of high quality masks which may accurately and vividly imitate the face of a real user. The existing systems may therefore erroneously verify an impersonator wearing such a high end mask in case the mask features comply with the reference pattern approved for the user.

In contrast, determining whether the user is genuine or a potential impersonator wearing a mask based on the infrared reflection characteristics of the user's face may prevent such deception by fraudulent impersonators since configuring the artificial man made mask to effectively, accurately and/or reliably simulate the human face infrared reflection characteristics may be significantly difficult and in practice impossible.

Moreover, analyzing the images to compute the infrared and visible light reflection attributes of only the subset of pixels in the images which relate to the face of the user may significantly reduce the computing resources required to compute the difference and aggregated difference values for determining whether the user is genuine or a potential impersonator wearing a mask. Reducing the computing resources, for example, processing resources, processing time, storage resources, power consumption and/or the like may be of particular benefit in certain deployments where low end client devices are used since such low end devices may be limited in their computing resources. Moreover, since reduced computing resources are employed, determining whether the user is genuine or a potential impersonator wearing a mask may be supported even for users using low cost, low end client devices.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of determining whether a user is genuine or potentially wearing a mask, according to some embodiments of the present invention.

An exemplary process 100 may be executed to detect potential impersonators impersonating as legitimate users in attempt to access one or more protected service, for example, an online service, a secure service, login to a client device (e.g. smartphone, tablet, laptop, etc.) and/or the like. In particular, the process 100 is executed to determine whether a user is genuine or a potential impersonator wearing a mask to impersonate as a legitimate user in attempt to access the protected service(s).

Detecting whether the user is genuine or an impersonator wearing a mask is done based on analysis of the user's face in a plurality of light spectral ranges, specifically one or more infrared light spectral ranges and the visible light spectral range. The infrared light spectral ranges may include, for example, Near Infrared (NIR) in a spectral range of approximately 700-1000 nanometer (nm), Short Wave Infrared (SWIR) in a spectral range of approximately 1000-3000 nm and/or the like while the visible light range occupies a spectral range of approximately 400-700 nm.

It should be noted that the process 100 for detecting whether the user is genuine or an impersonator wearing a mask is not directed to authenticating and/or identifying users but rather to determine whether the users are genuine or potential impersonators. The process 100 may be therefore executed to support one or more authentication systems, services and/or devices which are apply biometric authentication based on face recognition.

Figure 2A:
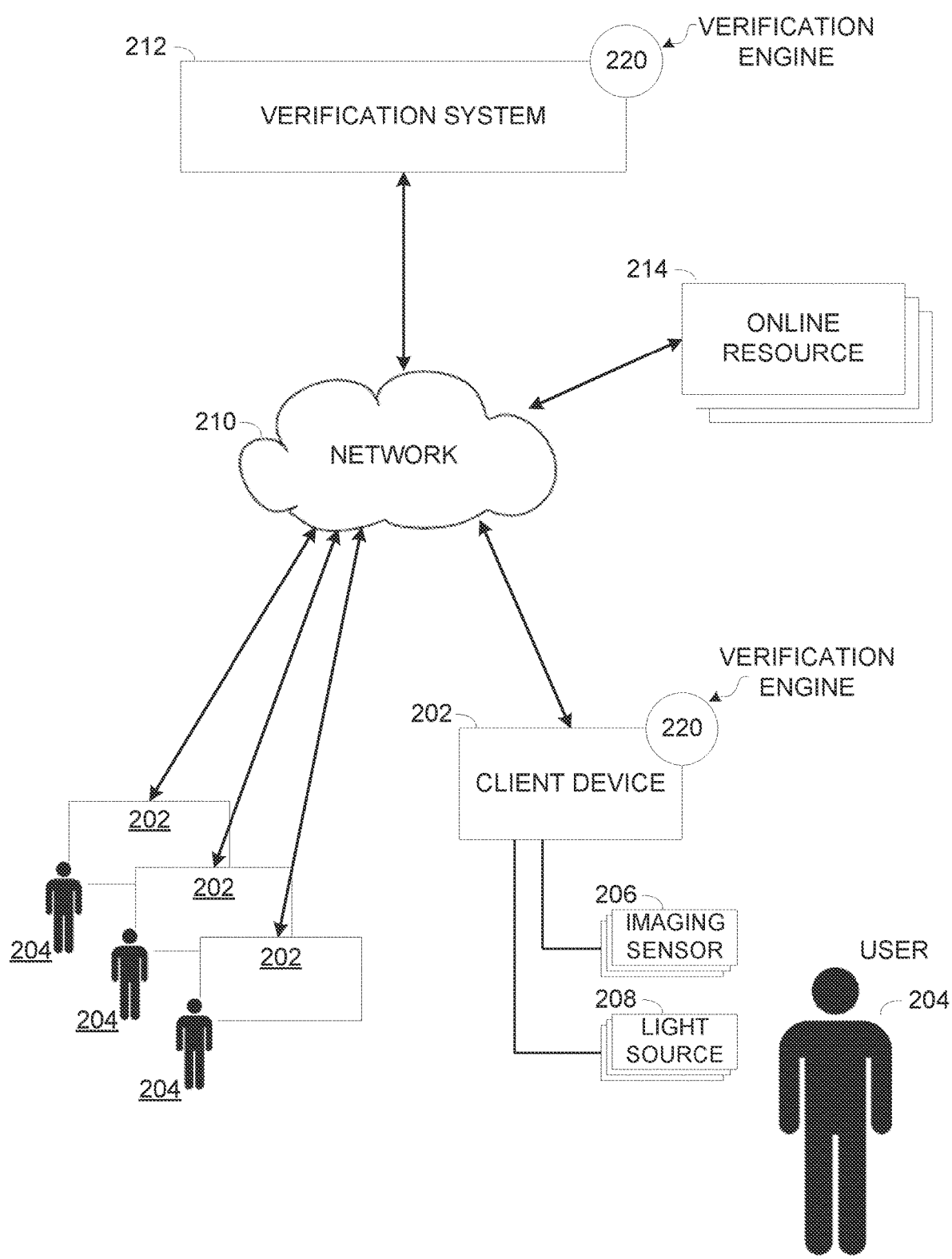
FIG. 2A and FIG. 2B are schematic illustrations of an exemplary system for determining whether a user is genuine or potentially wearing a mask, according to some embodiments of the present invention.
Figure 2B:
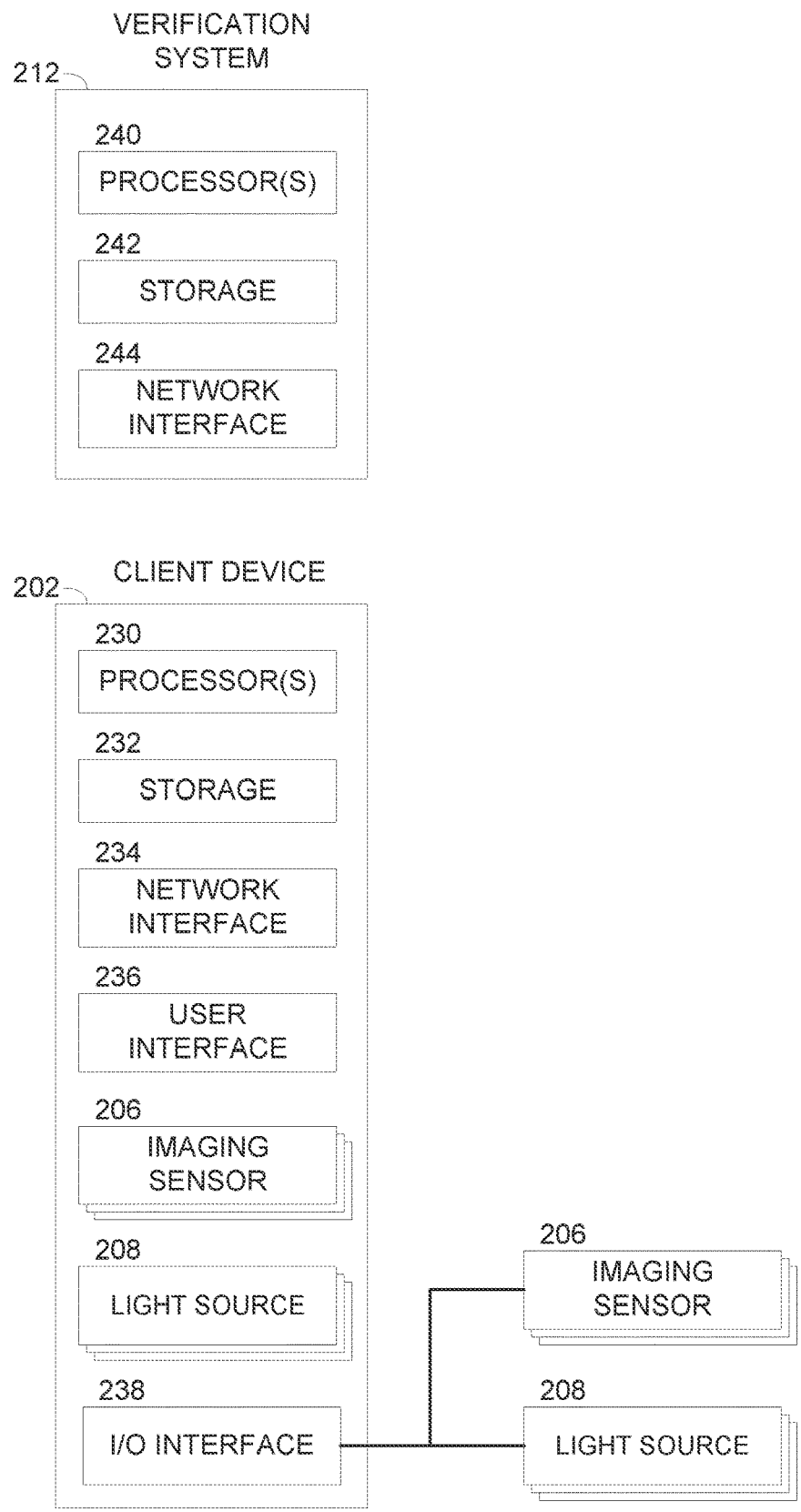

Reference is also made to FIG. 2A and FIG. 2B, which are schematic illustrations of an exemplary system for determining whether a user is genuine or potentially wearing a mask, according to some embodiments of the present invention.

As seen in FIG. 2A, one or more users 204 may use respective client devices 202, for example, a server, a desktop computer, a laptop computer, a Smartphone, a tablet, a proprietary client device and/or the like to access one or more protected devices, systems, services, and/or platforms collectively designated protected services herein after.

The protected services may require authentication of the accessing users 204 or at least a conformation that the accessing users 204 are genuine and not potential impersonators. The protected services may include local services typically associated with the client devices 202 used by the users 204, for example, login into the client device 202, engage in a video session with one or more other users 204 and/or the like. However, the protected services may further include one or more online resources 214, for example, a system, a service, a platform and/or the like accessible to the users 204 using their client devices 202. The online resources 214 may include, for example, a social network, an automated video authentication system, a financial service (e.g. online bank account, credit card account, purchasing service, etc.), a private network and/or the like.

The user 204 using his client device 202 may access the online resources 214 via a network 210 comprising one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet and/or the like.

The client device 202 may communicate with one or more imaging sensors 206, for example, a camera, a video camera, a webcam and/or the like configured to capture images of the user 204 while accessing the online service(s). Moreover, the imaging sensor(s) 206 may be configured to capture one or more sequences of consecutive images, for example, a video clip, a sequence of still images and/or the like, at one or more frame rates, for example, 25 frames per second (fps), 30 fps, 50 fps and/or the like.

Furthermore, the imaging sensor(s) 206 may be configured to capture images of the user 204 in a plurality of spectral ranges, specifically in the visible light spectral range and in one or more infrared spectral ranges, for example, NIR, SWIR and/or the like. The operational parameters and capabilities of the imaging sensor(s) 206 may be such that one or more imaging sensors 206 may be deployed to support capturing the images of the face of the user 204 in the plurality of spectral ranges. For example, a first imaging sensor 206 may be capable to operate in both the visible light spectral range and in one of the infrared spectral ranges, for example, NIR. In such case, while several such first imaging sensors 206 may be deployed, it may be sufficient to deploy only a single first imaging sensor 206 to capture images of the face of the user 204 in both the visible light spectral range and in the NIR spectrum. In another example, a second imaging sensor 206 may be capable of capturing images only in one of the infrared spectral ranges, for example, NIR while a third imaging sensor 206 may be capable of capturing images only in the visible light spectral range. In such case, one or more second imaging sensor 206 may be deployed to capture images of the face of the user 204 in the NIR spectral range and one or more third imaging sensor 206 may be deployed to capture images of the face of the user 204 in the visible light spectrum.

Optionally, one or more of the client devices 202 may be electrically and operationally coupled to one or more light sources 208 configured to project (emit) light on the face of the user 204 in one or more of the plurality of spectral ranges, for example, visible light spectral range, NIR, SWIR and/or the like.

The client device 202 may execute a verification engine 220 configured to execute the process 100 for determining whether the user 204 is genuine or a potential impersonator wearing a mask.

Optionally, a verification system 212, for example, a server, a computing node, a cluster of computing nodes and/or the like may be deployed provide user verification services for one or more of the client devices 202. In such case, the verification system 212 may execute the verification engine 220 to execute the process 100. In such case the remote verification engine 220 may receive images of the face of the user 204 captured by the imaging sensor(s) 206 and may further transmit an indication to the client device 202 of whether the user 204 using the client device 202 is a genuine user or a potential impersonator wearing a mask.

Moreover, the verification system 212, specifically the verification engine 220 may be implemented and/or utilized by one or more cloud computing services, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

Optionally, the verification system 212 may be integrated with one or more of the online resources 214 such that the verification engine 220 may be executed by the respective online resource 214 to verify whether a user 204 accessing the respective online resource 214 is a genuine user or a potential impersonator wearing a mask.

As seen in FIG. 2B, the client device 202 may comprise a processor(s) 230, a storage 232 for storing data and/or code (program store), a network interface 234 for connecting to the network 210 and a user interface 236 for interacting with the user 204.

As described herein before, the client device 202 may be communicatively coupled with the imaging sensor(s) 206 and may be further coupled to the light source(s) 208. The imaging sensor(s) 206 and the light source(s) 208 may be deployed in one or more arrangements and/or implementations. For example, the client device 202 may be equipped (include, integrate, etc.) one or more imaging sensors such as the imaging sensors 206. In another example, the client device 202 may be coupled to one or more light sources such as the light source 208.

However, the client device 202 may optionally include an Input/Output (I/O) interface 238 comprising one or more wired and/or wireless I/O interfaces, for example, a Universal Serial Bus (USB) port, a WLAN (e.g. Wi-Fi), a serial port, a Bluetooth (BT) interface, a Radio Frequency (RF) interface, an infrared (IR) interface, a Near Field (NF) interface and/or the like for communicating and/or attaching to one or more external devices and/or attachable devices. Via the I/O interface 238, the client device 202 may therefore communicate with one or more external and/or attachable imaging sensors such as the imaging sensors 206 and optionally with one or more external and/or attachable light sources such as the light source 208.

The processor(s) 230, homogenous or heterogeneous, may include one or more processing nodes and/or cores arranged for parallel processing, as clusters and/or as one or more multi core processor(s). The storage 232 may include one or more non-transitory persistent storage devices, for example, a Read Only Memory (ROM), a Flash array, a Solid State Drive (SSD), a hard drive (HDD) and/or the like. The storage 232 may also include one or more volatile devices, for example, a Random Access Memory (RAM) component, a cache and/or the like.

The network interface 234 may include one or more wired and/or wireless network interfaces, for example, a LAN interface, a WLAN interface, a WAN interface, a MAN interface, a cellular interface and/or the like. Via the network interface 234, the client device 202 may communicate with, for example, one or more of the online resources 214, one or more of the other client devices 202, with the remote verification system 212 and/or the like.

The user interface 236 may include one or more Human-Machine Interfaces (HMI) for interacting with the user 204, for example, a keyboard, a touchpad, a pointing device, a touchscreen, a screen, a digital pen, a speaker, an earphone, a microphone and/or the like.

The processor(s) 230 may execute one or more software modules such as, for example, a process, a script, an application, an agent, a utility, a tool and/or the like each comprising a plurality of program instructions stored in a non-transitory medium (program store) such as the storage 232 and executed by one or more processors such as the processor(s) 230. Optionally, the processor(s) 230 may include and/or be supported by one or more hardware modules (elements) integrated in the client device 202, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU) and/or the like.

The processor(s) 230 may therefore execute one or more functional modules which may be implemented via one or more software modules, one or more of the hardware modules and/or a combination thereof. In particular, the processor(s) 230 may execute the verification engine 220 for determining whether the user 204 is genuine or a potential impersonator wearing a mask.

The verification system 212 may comprise a processor(s) 240 such as the processor(s) 230, a storage 242 for storing data and/or code (program store) and a network interface 244 such as the network interface 234 for connecting to the network 210.

As described herein before for the processor(s) 230, the processor(s) 240 which may be homogenous or heterogeneous, may include one or more processing nodes arranged for parallel processing, as clusters and/or as one or more multi core processor(s). The storage 242 may include one or more non-transitory persistent storage devices, for example, a ROM, a Flash array, an SSD, an HDD and/or the like, as well as one or more volatile devices, for example, a RAM component, a cache and/or the like. The storage 242 may further comprise one or more network storage devices, for example, a storage server, a Network Accessible Storage (NAS), a network drive, a database server and/or the like accessible through the network interface 244.

The processor(s) 240 may execute one or more software modules each comprising a plurality of program instructions stored in a non-transitory medium (program store) such as the storage 242 and executed by one or more processors such as the processor(s) 240. The processor(s) 240 may further utilize one or more hardware modules (elements) integrated in remote verification system 210, for example, a circuit, a component, an IC, an ASIC, an FPGA, a DSP, a GPU, a network processor and/or the like.

The processor(s) 240 may therefore execute one or more functional modules implemented using one or more software modules, one or more of the hardware modules and/or combination thereof, in particular the verification engine 220 to determine whether the user 204 is genuine or a potential impersonator wearing a mask.

For brevity, the process 100 is described to determine whether a single user 204 using a respective client device 202 is a genuine user or a potential impersonator wearing a mask. This however, should not be construed as limiting since the process 100 may be expanded to determine whether a plurality of users 204 using respective client devices 202 are genuine users or potential impersonators wearing a masks.

As shown at 102, the process 100 starts with the verification engine 220 receiving one or more images captured by one or more of the imaging sensors 206 configured to monitor and capture one or more images of the face of the user 204 using the client device 202 to access one or more of the protected services.

In particular, the verification engine 220 may receive one or more visible light images depicting the face of the user 204 in the visible light spectral range which are captured by one or more of the imaging sensors 206 configured to operate in the visible light spectrum. In addition, the verification engine 220 may receive one or more infrared images depicting the face of the user 204 in one or more of the infrared spectral ranges, for example, NIR, SWIR and/or the like which are captured by one or more of the imaging sensors 206 configured to operate in the infrared spectral ranges.

As there exist multiple implementation, deployment and/or operation modes for executing the verification engine 220, the verification engine 220 may receive the images accordingly. For example, in case the verification engine 220 is executed by the client device 202 used by the user 204 to access the protected service(s), the verification engine 220 may receive the images from one or more of the imaging sensor(s) 206 coupled to the client device 202, for example, integrated in the client device 202 and/or attached to the client device 202 via one or more of the interfaces available in the I/O interface 238.

In another example, in case the verification engine 220 is executed remotely by the verification system 212 which may optionally be integrated with the online resource 214 itself, the client device 202 may transmit at least some of the images captured by the imaging sensor(s) 206 to the remote verification engine 220 via the network 210.

In another example, assuming a first user 204 uses a first client device 202 to engage in a video session with a second user 204 using a second client device 202 where the second user 204 wants to determine whether the first user 204 is a genuine user or a potential impersonator wearing a mask. In case the verification engine 220 is executed by the first client device 202, the verification engine 220 may receive the images of the face of the first user 204 from the imaging sensor(s) 206 coupled to the first client device 202 which are deployed to depict the first user 204. In case the verification engine 220 is executed by the second client device 202, the verification engine 220 may receive, from the first client device 202 via the network 210, at least some of the images captured by the imaging sensor(s) 206 associated with the first client device 202.

Optionally, one or more of the light sources 208 may be operated to project (emit) light on the face of the user 204 in one or more of the spectral ranges to improve lighting conditions and enhance and/or improve the quality of at least some of the images. For example, the light source(s) 208 may be operated to project visible light on the face of the user 204 thus improving illumination conditions for the visible light image(s). In another example, the light source(s) 208 may be operated to project light on the face of the user 204 in one or more of the infrared spectrums, for example, NIR, SWIR and/or the like thus improving illumination conditions for the infrared image(s).

The light source(s) 208 may be operated by the verification engine 220. In such case, the verification engine 220 may turn on the light source(s) 208 while the imaging sensor(s) 206 capture the images of the face of the user 204. However, the light source(s) 208 may be independently of the verification engine 220, for example, continuously, coupled with the operation of the imaging sensor(s) 206 and/or the like.

As shown at 104, the verification engine 220 may register (align) the images captured in different spectral ranges, specifically the visible light image(s) captured in the visible light spectral range and in the infrared image(s) captured in the infrared spectral range(s) to establish a common reference between the images, for example, a common coordinate system and/or the like such that corresponding pixels in the visible light and infrared images depicting the same spectral location in the real world may overlap with each other. The verification engine 220 may apply one or more methods and/or techniques as known in the art to register the infrared image(s) and the visible light image(s) to each other.

For example, the verification engine 220 may register the infrared image(s) and the visible light image(s) based on calibration of the imaging sensor(s) 206 which captured the images. For example, assuming the infrared image(s) and the visible light image(s) are captured by a certain single imaging sensor 206 configured to operate in both the visible light spectral range and in the infrared spectral range. In such case, the operational parameters and/or mounting parameters of the certain imaging sensor 206, for example, positioning, orientation, field of view, zoom, resolution and/or the like may be known and typically common to the infrared image(s) and the visible light image(s). The single certain single imaging sensor 206 may be therefore inherently calibrated and the verification engine 220 may register accordingly the infrared image(s) and the visible light image(s). In another example, assuming the infrared image(s) and the visible light image(s) are captured by multiple distinct imaging sensors 206 each configured to operate in one or more of the spectral ranges. In such case, the verification engine 220 may calibrate the different imaging sensors 206 according to known positioning, operational and/or mounting parameters of the plurality of imaging sensors 206 with respect to each other and may register accordingly the infrared image(s) and the visible light image(s).

In another example, the verification engine 220 may register the infrared image(s) and the visible light image(s) based on a depth analysis of the images conducted to map the face of the user 204 in the images, i.e. to identify the sections, segments and/or regions in the images which depict the face of the user 204. The verification engine 220 may then register the infrared image(s) and the visible light image(s) by correlating the mapped sections, segments and/or regions depicting the face in each of the images.

In another example, the verification engine 220 may register the infrared image(s) and the visible light image(s) based on an analysis conducted to map one or more facial features identified in the images, for example, a face contour, a nose outline, an ear outline, an eye outline, a lip outline, an eye location, a pupil location and/or the like. The verification engine 220 may then register the infrared image(s) and the visible light image(s) by correlating and overlapping the facial features identified in each of the images.

As shown at 106, the verification engine 220 may analyze the visible light image(s) to compute a luminance value as known in the art for each of the pixels of the visible light image(s). The luminance value computed for each of the pixels may be also interpreted as a brightness value of the respective pixel which is indicative of the level of reflectiveness of visible light of the respective pixel.

As shown at 108, the verification engine 220 may analyze the infrared image(s) to compute an infrared reflectiveness value as known in the art for each of the pixels of the image(s).

Since the infrared image(s) and the visible light image(s) are registered to a common reference, for example, a common coordinate system, the pixels in the infrared image(s) are mapped to corresponding pixels in the registered visible light image(s) such that corresponding pixels in the registered images depict the same real world spatial location.

Moreover, when analyzing the visible light images(s) (step 106) and the infrared image(s) (step 108), the verification engine 220 may first detect the face of the user 204 in the images and process only pixels which are mapped to the face, i.e., pixels relating to the face of the user 204. This means that the verification engine 220 may compute luminance values and infrared reflectiveness values only for the pixels relating to the face of the user 204. The verification engine 220 may apply one or more face detection methods and/or algorithms as known in the art, for example, computer vision, image processing, classifier and/or the like to identify the face of the user 204, for example an outline of the face, a texture of the face, one or more facial features and/or the like. The face detection algorithms may include traditional techniques and/or machine learning models, for example, Haar Cascades, Eigenface based algorithm, PCA and Fisher's Discriminant, SVM and/or the like. The face detection algorithms may further include Artificial Neural Network (ANN) based algorithms including Deep Learning Neural Networks (DNN) as known in the art.

As shown at 110, the verification engine 220 may compute a difference value between the luminance value of each of the pixels in the visible light image(s) and the infrared reflectiveness value of the corresponding pixel in the registered infrared image(s). For example, the verification engine 220 may compute the difference value of each pixel by subtracting the infrared reflectiveness value of the respective pixel from the luminance value of the respective pixel.

As shown at 112, the verification engine 220 may compute an aggregated difference aggregating the difference values computed for the plurality of pixels in the registered visible light and infrared images. The verification engine 220 may apply one or more methods, techniques, algorithms and/or formulations to compute the aggregated difference. For example, the verification engine 220 may compute the aggregated difference as an average of the plurality of difference values of the plurality of pixels. Moreover, the verification engine 220 may compute the aggregated difference as a weighted average of the plurality of difference values where each of the pixels may be assigned a weight according to its contribution to the aggregated difference, for example, its location on the images. For example, edge pixels may be assigned lower weights than pixels located in the center of the images since the face of the user is assumed to be the focus of the images and may therefore occupy the center region of the images.

Furthermore, the verification engine 220 may compute the aggregated difference for only a subset of the pixels in the registered visible light and infrared images, specifically, for pixels relating and/or mapped to the face of the user 204. The verification engine 220 may apply one or more methods to identify the subset of pixels relating to (mapping, depicting, etc.) the face of the user 204.

Moreover, the verification engine 220 may detect the face of the user 204 based on a comparison of each pixel in the registered images to its surrounding neighboring pixels. For example, the verification engine 220 may compute a median difference value for each of the pixels in the registered visible light and infrared images based on a sliding window comprising a group of pixels around the respective pixel. The verification engine 220 may move the sliding window over the pixels of the image(s) and in each window (position) the verification engine 220 may compute a median (middle) difference value for the middle pixel based on the difference between the ratio values computed for the middle pixel in the window based on the difference values of the group of surrounding pixels in the window. The sliding window may include a group comprising a predefined number of pixels, for example, 5×5 and the sliding window may be moved by a predefined step, typically 1 pixel across the image(s) such that the median value may be computed for each pixel. Due to human skin infrared light reflection characteristics, the difference value may be significantly higher for pixels depicting the face of the user 204 compared to pixels not depicting the face. Based on the median difference values computed for the pixels in the images, the verification engine 220 may therefore detect the outline and/or edges of the face of the user 204.

As shown at 114, which is a conditional step, in case the aggregated difference exceeds a certain value, for example, 20%, 25%, 30% and/or the like the process 100 may branch to 116. However, in case the aggregated difference does not exceed the certain value, the process 100 may branch to 118.

The human skin is characterized, as known in the art, by reflecting significantly lower level of infrared light compared to the level of visible light it reflects. Moreover, artificial materials, in particular, materials used to produce masks, for example, silicon, rubber, polyester and/or the like are characterized by reflecting similar light levels across the visible light spectral range and the infrared spectral range(s), for example, NIR, SWIR and/or the like.

As shown at 116, since the aggregated difference exceeds the certain value, meaning that the pixels in the images reflect significantly less infrared light than visible light, the verification engine 220 may determine that the user 204 is a genuine user, specifically the verification engine 220 may that the user 204 is not wearing a mask.

As shown at 118, on the other hand, since the aggregated difference does exceed the certain value, meaning that the pixels in the images reflect substantially similar light levels in the infrared and visible light spectral ranges as typical to mask materials, the verification engine 220 may determine that the user 204 is potentially wearing a mask.

The verification engine 220 may further output an indication accordingly of whether the user is determined to be genuine or potentially wearing a mask. For example, assuming the user 204 attempts to access one or more of the protected services requiring authentication, the verification engine 220 may output (e.g. transmit, deliver, distribute, etc.) the indication of whether the user is estimated to be a genuine user or a potential impersonator wearing a mask to one or more authentication systems deployed to authenticate the user 204 before granting him access to the protected service(s). In another example, assuming the use 204 engages in a video session with one or more other users 204, the verification engine 220 may transmit the indication of whether the user is estimated to be genuine or a potential impersonator wearing a mask to the client device(s) 202 used by the other user(s) 204 which may alert the respective user(s) 204 accordingly.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms imaging sensors are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of determining whether a user is wearing a mask, comprising:
   using at least one processor for:
      receiving at least one infrared image depicting a face of the user in at least one infrared spectral range and at least one visible light image depicting the face of the user in visible light spectral range;
      registering the at least one infrared image to the at least one visible light image;
      computing luminance values of a plurality of pixels relating to the face of the user in the at least one visible light image;
      computing luminance values of corresponding pixels in the registered at least one infrared light image;
      computing a difference between the luminance value of each pixel in the at least one visible light image and the luminance value of the corresponding pixel in the at least one infrared light image; and
      determining the user is genuine and not wearing a mask in case an aggregated difference aggregating the difference values of the pixels relating to the face exceeds a certain value.

2. The method of claim 1, wherein the certain value equals 25%.

3. The method of claim 1, further comprising operating at least one light source to project light on the face of the user in at least one of a plurality of spectral ranges comprising visible light spectral range and at least one infrared spectral range.

4. The method of claim 1, wherein the plurality of pixels relating to the face of the user are identified using at least one face detection algorithm.

5. The method of claim 1, wherein the plurality of pixels relating to the face of the user are identified by computing a median difference value between the visible light reflectiveness value of each of a plurality of pixels of the at least one visible light image and the infrared reflectiveness value of the corresponding pixel in the at least one infrared image with respect to adjacent pixels using a sliding window comprising a group of pixels around the respective pixel.

6. The method of claim 5, wherein the size of the sliding window is 5×5 pixels and is moved in 1 pixel steps.

7. The method of claim 1, wherein the at least one infrared spectral range is a member of a group consisting of: near infrared (NIR) having a wavelength in a range of 700-1000 nanometers and short wave infrared (SWIR) having a wavelength in a range of 1000-3000 nanometers.

8. The method of claim 1, wherein registering the at least one infrared image to the at least one visible light image is based on a calibration of at least one imaging sensor configured to capture the at least one infrared image with respect to at least one imaging sensor configured to capture the at least one visible light image.

9. The method of claim 1, wherein registering the at least one infrared image to the at least one visible light image is based on a depth analysis mapping the face of the user in the at least one infrared image compared to the at least one visible light image.

10. The method of claim 1, wherein registering the at least one infrared image to the at least one visible light image is based on analysis of at least one facial feature identified the face of the user in the at least one infrared image and in the at least one visible light image.

11. A system for determining whether a user is wearing a mask, comprising:
   at least one processor configured to execute a code, the code comprising:
      code instruction to receive at least one infrared image depicting a face of a user in at least one infrared spectral range and at least one visible light image depicting the face of the user in visible light spectral range;
      code instruction to register the at least one infrared image to the at least one visible light image;
      code instruction to compute luminance values of a plurality of pixels relating to the face of the user in the at least one visible light image;
      code instruction to compute luminance values of corresponding pixels in the registered at least one infrared light image;
      code instruction to compute a difference between the luminance value of each pixel in the at least one visible light image and the luminance value of the corresponding pixel in the at least one infrared light image; and
      code instruction to determine the user is genuine and not wearing a mask in case an aggregated difference aggregating the difference values of the pixels relating to the face exceeds a certain value.

12. A computer program product for determining whether a user is wearing a mask, comprising, comprising a non-transitory computer readable medium storing thereon computer program instructions which, when executed by at least one hardware processor, cause the at least one hardware processor to:
   receive at least one infrared image depicting a face of a user in at least one infrared spectral range and at least one visible light image depicting the face of the user in visible light spectral range;
   register the at least one infrared image to the at least one visible light image;
   compute luminance values of a plurality of pixels relating to the face of the user in the at least one visible light image;
   compute luminance values of corresponding pixels in the registered at least one infrared light image;
   computer a difference between the luminance value of each pixel in the at least one visible light image and the luminance value of the corresponding pixel in the at least one infrared light image; and
   determine the user is genuine and not wearing a mask in case an aggregated difference aggregating the difference values of the pixels relating to the face exceeds a certain value.

* * * * *